United States Patent
Fifer

[15] 3,666,242
[45] May 30, 1972

[54] WASTE TREATMENT APPARATUS AND CIRCULATION UNIT THEREFOR

[72] Inventor: Rolland L. Fifer, P.O. Box 13175, Louisville, Ky. 40213

[22] Filed: Feb. 18, 1971

[21] Appl. No.: 116,461

[52] U.S. Cl. .................................. 259/8, 259/97, 210/197
[51] Int. Cl. ...................................................... B01f 7/22
[58] Field of Search .................. 259/7, 8, 97, 95; 210/197, 210/195, 196

[56] References Cited

UNITED STATES PATENTS

| | | | |
|---|---|---|---|
| 2,889,047 | 6/1959 | Coate | 210/197 |
| 2,987,186 | 6/1961 | Burgoon | 210/197 |
| 2,991,983 | 7/1961 | Logan | 259/97 |
| 3,053,390 | 9/1962 | Wood | 210/195 |
| 3,235,232 | 2/1966 | Conover | 259/97 |

Primary Examiner—Robert W. Jenkins
Attorney—Norman L. Wilson, Jr.

[57] ABSTRACT

In the activated sludge treatment of sewage and similar wastes the method of treatment involves the use of a tank in which sewage is mixed with previously activated sludge and subjected to the action of bacteria. Since oxygen is necessary for bacterial action, air distributing means are employed in such units. Herein a circulation and oxygenation cell is disposed in the aeration chamber adapted to draw floating material through the circulating unit from a plurality of zones at spaced points about the surface of the liquor.

6 Claims, 4 Drawing Figures

PATENTED MAY 30 1972 3,666,242

INVENTOR
ROLLAND L. FIFER
BY Norman L. Wilson Jr.
HIS ATTORNEY

INVENTOR
ROLLAND L. FIFER
BY Norman L. Wilson Jr.
HIS ATTORNEY

WASTE TREATMENT APPARATUS AND CIRCULATION UNIT THEREFOR

BACKGROUND OF THE INVENTION

In the activated sludge treatment of sewage the method of treatment involves the use of a tank in which sewage is mixed with previously activated sludge and subjected to the action of bacteria. This aerobic treatment is usually carried out in large tanks. Ordinarily the rate of movement of sewage through the tank is low so that the sewage will remain in the tank a sufficient length of time to allow the bacteria to properly act upon the sewage. Since oxygen is necessary for bacterial action, air distributing means are employed, and these means are usually so arranged as to make it possible for the sewage to receive and absorb from the air as much oxygen as is necessary to support the bacterial action. In order to procure proper action it is also essential to keep the body of sewage in substantially constant movement to avoid any settling or separating out of heavier or more solid particles. Aerobic treatment tanks must, then, be so constructed as to perform the functions of circulation and mixing continuously or intermittently for a period of time sufficient to purify the material so that the effluent therefrom has a safe biological oxygen demand (B.O.D.). Treated liquid overflows from the aerating tank into one or more settling or clarifying tanks. In one type of aerating apparatus air or oxygen is introduced into the aerating tank by means of an air diffuser line. In another apparatus an impeller is used to draw air into the liquid sludge as the sludge is agitated. This invention is concerned with aeration chambers of the impeller type.

Sewage or waste treatment apparatus of the type contemplated herein are described in U.S. Pat. Nos. 3,053,390, 2,987,186 and 2,889,047. In U.S. Pat. No. 3,053,390 a shaft which carries an impeller on its bottom end shaft extends downwardly into the aeration chamber. The shaft is surrounded by a tube through which air is drawn by the impeller. A second tube, with its mouth opening into the aeration chamber near one side terminates below the impeller. Circulation and aeration are achieved by air being drawn in above the impeller and liquid sludge being circulated through the tube ending below the impeller. The disadvantage of this apparatus is that sludge being returned through the mouth of the tube is drawn off only at one point in the liquid level. This single sludge return does not effect complete circulation of sludge being aerated.

In U.S. Pat. Nos. 2,889,047 and 2,987,186 the impeller shaft is surrounded by an aeration tube which draws sludge as well as air in around the shaft. In each instance the recirculating tube is formed with a funnel-like upper lip portion at the top of the circulating tube. Since the recirculating tube draws liquid sludge in at the center for circulation, outer portions of the liquid sludge are not fully circulated, and treated.

SUMMARY OF THE INVENTION

In accordance with the practice of this invention a waste liquid or sewage treatment apparatus of the anaerobic decomposition type is provided which effects more complete circulation within the aeration tank. The unit not only draws liquor from the periphery of the aeration chamber in effecting circulation, but also macerates incoming wastes or raw sewage thereby promoting bacterial action. In the apparatus a circulation and oxygenation unit is disposed in about the center of the aeration chamber. This unit contemplates a tubular waste inlet cell disposed in an upright position. The cell has a closed top, and a plurality of ports in the upper portion thereof at the normal liquid level to admit both recirculating waste liquid and air into the cell. The bottom end of the cell is open, permitting flow of waste liquid from the cell into the bottom of the aeration chamber. Air liquid conduit means cooperate with the cell. Aeration and circulation are accomplished by the provision of a series of conduits the same size as each port, connected over each porthole thereby becoming integral with the cell and extending radially outwardly perpendicular to the axis of the cell. An impeller is mounted within the cell in a lower portion of the cell above the open outlet. The impeller draws recirculating waste liquid and air first through the conduits and then down through the cell. An influent inlet opening is provided above the impeller to macerate influent solids as they are drawn down through the cell.

DETAILED DESCRIPTION OF THE INVENTION

This invention can perhaps be better understood by reference to specific embodiments described in conjunction with the accompanying drawings.

It is understood that auxiliary pipe lines, electric wire fittings and the like have been omitted from the drawings. Since waste treatment plants of the impeller type are known such details are within the skill of the art. It is the practice in units of this type to effect recirculation by skimming off floating sludge and flocculent material. This invention is based, in part, on the provision of a circulation inducing unit adapted to draw floating material through the circulating unit from a plurality of zones at spaced points about the surface of the liquor. This is accomplished by means of tubes, or troughs 16.

Figure 1:
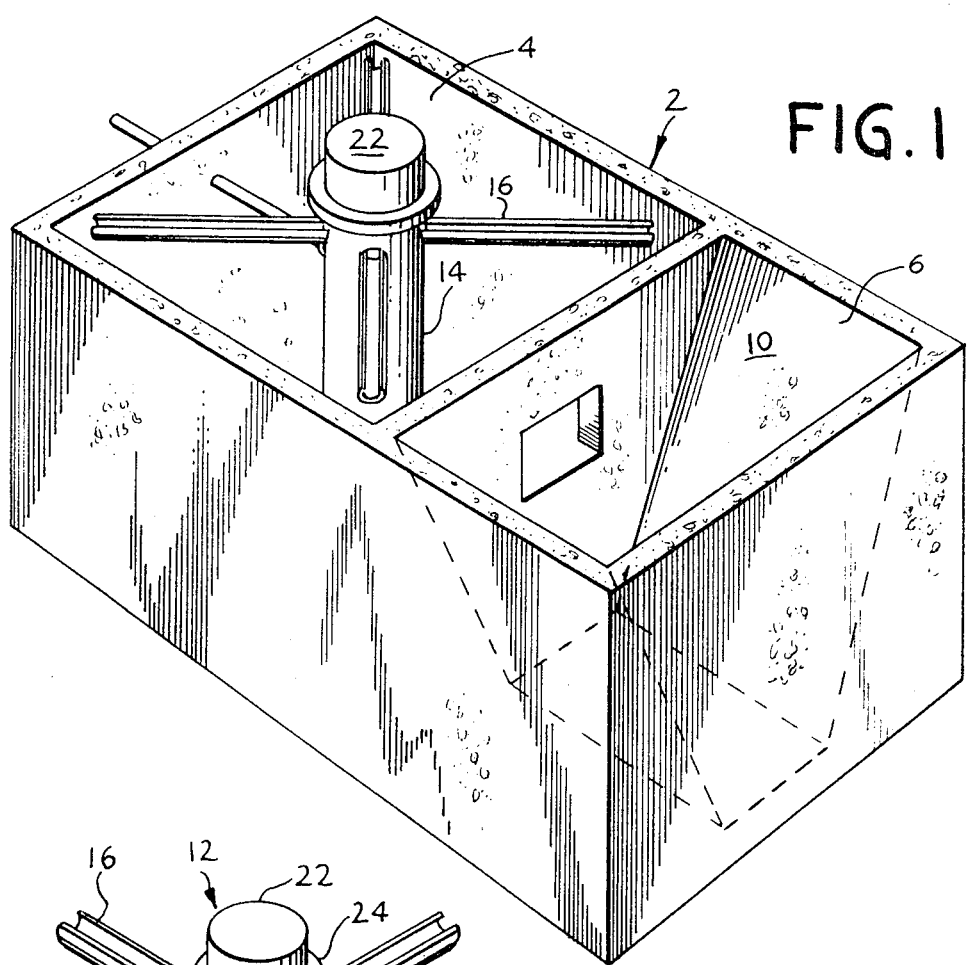
FIG. 1 is an isometric view of one sewage treatment plant embodying the invention.

A complete waste treatment plant 2, constructed of reinforced concrete or metal, depending on capacity, can be seen in FIG. 1. The apparatus is divided into two compartments 4 and 6. However these can be separate vessels if desired. Compartment 4 is an aeration chamber containing liquor being subjected to biological action. The apparatus is operated with a constant amount liquor in aeration chamber 4 establishing a fixed liquid level or flow line shown in FIG. 3. The unit is sized based on use so that liquor will remain in aeration chamber 4 for a period of time sufficient for oxidation to take place. It then overflows wier 8 into compartment 6 which is a clarification chamber provided with fillets 10. The apparatus thus operates in the usual and known manner.

Figure 4:
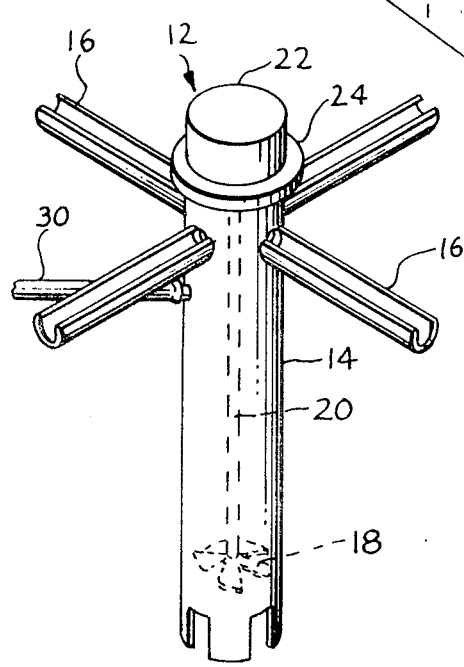
FIG. 4 is an isometric view showing a circulating and oxygenating unit which can be placed in any aeration chamber.
Figure 2:
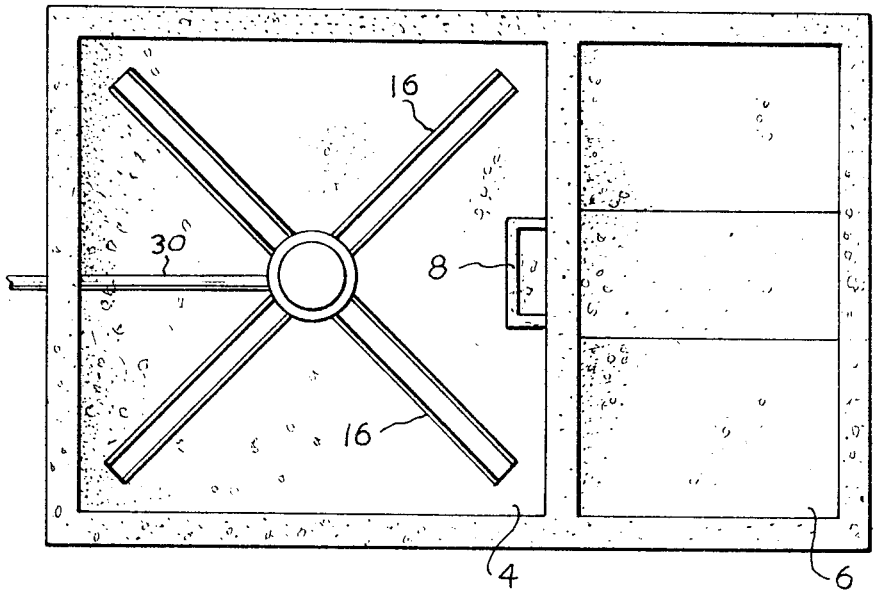
FIG. 2 is a top plan view of the apparatus shown in FIG. 1.

In the aeration chamber oxygen must be provided for conversion and bacterial action. Additionally, a turbulent flow pattern must be effected to maintain a circulation of liquor throughout the aeration tank so as to minimize quiescent zones and to prevent accumulation of floating unreacted solids on the liquor surface. Circulation and aeration herein are achieved by oxygenation unit 12. This unit is in the form of a tubular cell 14 provided near its top with radial ducts 16. Inside the cell an impeller is disposed near the lower end of the cell as shown in FIG. 4.

Figure 3:
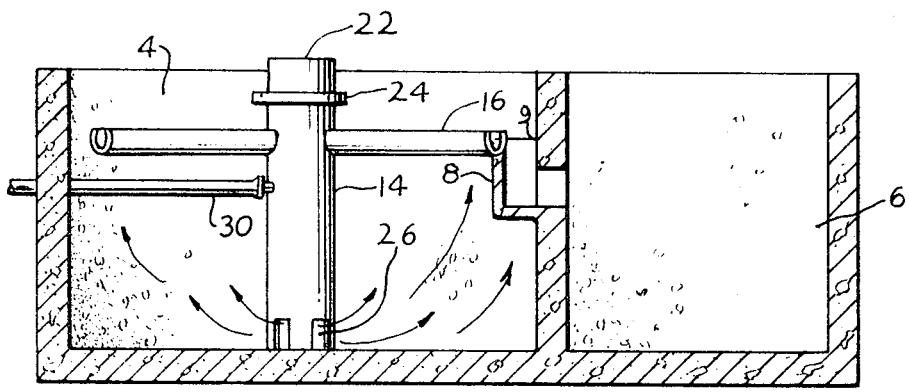
FIG. 3 is a sectional view of the same apparatus.

Referring now in greater detail to recirculation or oxygenation unit 12, this unit is disposed partly within aeration tank 4 as shown in FIG. 3 and is operable to introduce air into the fluid waste material or sewage in the tank. The introduction of air is accomplished by impeller 18 seen in FIG. 4. This impeller can be driven from above or below. Desirably however impeller 18 is secured to the lower end portion of drive shaft 20 which is mounted within cell 14, usually along the vertical axis thereof. The drive shaft and hence impeller 18 are driven by a motor 22. This motor is mounted on platform 24 and is adapted to directly drive shaft 20. Desirably, in order to change impeller speed to bring in more or less oxygen as desired, a belt and pulley wheel or other coupled or geared drive means will be employed. In any event the actuation of motor 22 will cause drive shaft 20 and hence impeller 18 to rotate at the desired speed. The speed of rotation will depend upon the size of the cell, which in turn is based on the capacity of the treatment unit. Generally the impeller will rotate at a speed of 300 to 900 revolutions per minute.

Blades of impeller 18 are so constructed that on rotation a downward fluid surge through the cell is developed. The column of liquid and any air within cell 14 above the impeller is thus forced downwardly toward the floor of aeration chamber 4. An opening is provided in the top of the aeration chamber for the admission of air from outside the unit. Cell 14 terminates above the aeration chamber floor, or else the cell is provided with passageways 26 through which circulating liquid moves out into the aeration tank. The operation of impeller 18 in creating the surge of fluid down through cell 14 also draws liquid from the peripheral portions of the waste liquid surface through ducts 16. This liquid and also air are drawn in through the portholes. Thus the outward surge of liquid beneath the cell, such as through openings 26, and the inward draw of liquid through ducts 16 create a flow pattern within the tank as shown by the arrows in FIG. 3.

As noted hereinbefore in addition to creating the flow pattern just described, the impeller draws incoming sewage down through its blades thereby serving as a maceration unit as well as a circulation unit. An influent conduit 30 is connected to the cell at a point in its circumferential surface beneath the radial ducts. The impeller 18 as a result of its pitch, agitation and spin forces the raw sewage down and out into the aeration chamber along with aerated liquor.

It has been pointed out that the operation of sewage treatment plants in which this aeration and circulation unit will be employed will be of the conventional type similar to that described in U.S. Pat. Nos. 2,852,140, 2,987,186 and others. The sewage remains in aeration chamber 4 while oxidation and bacterial action take place as described hereinbefore. The treatment plant is operated at a constant liquid level, maintained by weir 8, at about the horizontal diameter of ducts 16. This level is shown in FIG. 3 as line 9, which is the top edge of weir 8. Thus a 500 gallon unit has been operating very satisfactorily with a 4 foot long cell having a diameter of 14 inches containing a four-wing type 12 inch impeller operating at 533 revolutions per minute. Compartment 6 acts as a clarifier for further purification of the waste liquid prior to disposal.

Several ramifications and modifications of this invention will occur to those skilled in the art. For example aeration and circulation unit such as 12 of FIG. 4 can be provided for existing sewage treatment plants, the unit replacing present aerating means. In addition aeration cell 14 rather than having a circular cross section can have a polygonal cross section such as a square, hexagonal or an octagonal cross section. It will be understood also that circulation unit 12 will be sized to fit the particular aeration chamber in which it will be used. The overflow must be such that the liquid level covers part but not all of the duct openings. As indicated a 500 gallon unit contains a cell 14 which is 4 feet high and has a diameter of 14 inches. In a 1,000 gallon treating plant a 14 inch diameter cell would be 7 feet high. It can be seen too that ducts 16 are shown to have open tops making them trough-like. There is no reason cylindrical conduits cannot be employed. Likewise openings 26 in the base of the cell can assume any conformation, or the cell can be suspended so that it terminates above the aeration chamber floor. Such variations are deemed to be within the scope of this invention.

What is claimed is:

1. In a waste treatment apparatus of the anaerobic decomposition type having aeration and clarification chambers formed by retaining walls, the combination of an aeration chamber with a circulation and oxygenation unit within the aeration chamber additionally macerating incoming waste solids, the unit comprising a tubular waste inlet cell disposed in an upright position in about the center of the aeration chamber, said cell having a closed top, a plurality of ports in the upper portion thereof at the normal aeration chamber liquid level to admit both recirculating waste liquid and air into said cell, and an open outlet in its bottom end for flow of waste liquid into the bottom of the aeration chamber, air-liquid conduit means integral with the cell, including a series of conduits, each the same size as a port, one conduit being connected over each porthole virtually perpendicular to the axis of the cell, extending radially outwardly from the cell to a point close to the walls of the aeration chamber in such a manner that waste liquid passing through the ports must pass through said connecting conduits, an impeller mounted within said cell in a lower portion thereof above the open outlet, the blades of said impeller being so adapted that waste liquid is drawn down through the cell, an influent inlet opening into said cell at a point above the impeller, mechanical means for driving the impeller to macerate influent solids in the cell, to draw air and circulating liquor through the connecting conduits and down through the cell, and to eject the waste liquid through the cell open outlet.

2. The apparatus of claim 1 wherein the conduits connected to the portholes are cylindrical tubes enclosing said portholes.

3. The apparatus of claim 1 wherein the conduits connected to the portholes are troughs enclosing the bottom halves of said portholes.

4. The apparatus of claim 1 wherein the aeration chamber has a square cross section, wherein the cell has four ports, wherein the conduits covering the ports extend to the four corners terminating a few inches therefrom and wherein the mechanical drive means includes a motor coupled to a shaft extending down into the cell.

5. The apparatus of claim 1 wherein the aeration chamber is cylindrical and wherein the cell in the center thereof has more than 4 ports and conduits covering said ports.

6. The circulation and oxygenation unit of claim 1.

* * * * *